UNITED STATES PATENT OFFICE 2,079,944

PLASTIC AND METHOD OF CURING

George Spencer Lobdell, Rome, N. Y., assignor to General Cable Corporation, New York, N. Y., a corporation of New Jersey No Drawing. Application October 26, 1932, Serial No. 639,733

15 Claims. (Cl. 106—22)

This invention relates to plastic substances, and more particularly to compounds containing organically combined sulfur of high sulfur ratio. It is an object of the invention to provide an improved plastic substance and an improved method of curing such substances. Other objects and advantages of the invention will appear hereinafter.

The plastic substance disclosed in Canadian Letters Patent No. 290,645, June 18, 1929, to Joseph C. Patrick, consists mainly of organically combined sulfur. This plastic substance may be formed by the interaction of halogen additive compounds of olefins with polysulfides, for example, by the interaction of ethylene dichloride and sodium polysulfide, and merely for convenience in description may be described as an olefin polysulfide reaction product, and in the exemplary case as a condensation product of ethylene dichloride and an alkali polysulfide. This substance, which is a combination of carbon, hydrogen and sulfur, has certain physical properties resembling those of rubber. The hardness of this substance may vary over a wide range, dependent on the sulfur content, from a hard product to a soft elastic product. For the insulation of flexible electrical conductors the sulfur content desirably is about 82% to 83%.

The properties of this substance differ from those of rubber in a number of important respects. This plastic substance is highly resistant to decomposition by oils, acids and alkalis, and is substantially insoluble in practically all known acids, alkalis and organic solvents. It often is desirable that the insulation of electrical conductors be immune to attack by oils, acids, alkalis and organic solvents.

This plastic substance has a further important advantage over rubber as an electrical insulating material for the reason that this plastic substance is very highly resistant to injury by the effects of electrical corona. In rubber-insulated conductors used at medium or high voltages, particularly if the rubber is also under physical stress such as is caused by bending the conductors, the ozone which is formed by the corona cuts and destroys the rubber. Experimental tests have shown that this plastic substance is substantially unaffected by corona, and that for the same thickness of insulation it may be used at high voltages and under physical conditions which are prohibitive for rubber.

These olefin polysulfide reaction products desirably are mixed with fillers and curing agents in somewhat the same manner as rubber. The term olefin polysulfide reaction product is used herein to include such mixtures in the same sense that "rubber" is used as a broad term to include mixtures of pure rubber with fillers and curing agents.

Olefin polysulfide reaction products may be cured by heating in a manner somewhat similar to that used in curing rubber, as by the open steam process, but when so cured the resultant substance is very spongy and porous. Although these substances are cured by heating, the word "cured" has an entirely different significance than when used with reference to rubber. In the case of rubber, curing comprises the combination of the rubber with sulfur, whereas in the case of olefin polysulfide reaction products, curing comprises the production of a stable chemical compound from an unstable form of the same compound. Cured olefin polysulfide reaction products loaded sufficiently to reduce porosity have a low resistance to fatigue and crack rather easily, and the dielectric qualities are not satisfactory for use in insulating electrical conductors. During the curing of olefin polysulfide reaction products by the heat process a disagreeable gaseous decomposition product is given off having the characteristics of tear gas. The formation of this gas makes the handling and curing of the substance more difficult.

The difficulties encountered in curing olefin polysulfide reaction products may be partially overcome by the addition of rubber. It has been found that the addition of very small quantities of rubber does not seriously affect the resistance of the resulting mixture to oils, acids, alkalis, and organic solvents. However, if rubber is added in sufficient quantities to materially reduce the porosity and sponginess of the cured product, the resistance to oil and to the effects of electrical corona are greatly reduced.

It is believed that the objectionable porosity and sponginess in the cured olefin polysulfide reaction products is caused by the formation of the gaseous decomposition product, probably a thio-aldehyde, in the substance during the heating process. Other substances may be added to accelerate the curing of the olefin polysulfide reaction products, but in the manufacture of insulated wires it is impractical to use an accelerator sufficiently rapid to effect complete curing of the substance before gas is formed in any substantial quantity. The reason for this is that the use of such a rapid accelerator would result in the precuring of the substance on the rolls and in the extruding machines before the substance is on the wire. Furthermore, such a rapid accelerator would result in any rubber in the mixture being overcured.

Applicant has found that olefin polysulfide reaction products may be heat treated to give a substantially non-porous product by adding to the compound before heating another substance which substantially prevents the formation of free gas in the compound. It is believed that this added substance combines with the gaseous decomposition product to form a condensation product with a low vapor pressure, thereby substantially preventing the formation of pores and holes in the compounds. Such substances are found in the classes of aromatic amines, napthylamines, napthols and phenols, and contain the group $NH_2$ or the group OH combined with radicals which so limit the activity of these groups as to cause the prevention of gas formation to take place under curing conditions.

In this use the chemical activity of the individual members of these classes varies, and therefore the most effective member of these series of compounds is determined by the conditions of curing the olefin polysulfide reaction products. For example, applicant has found that a small amount of orthotoluidine incorporated in an olefin polysulfide reaction product before curing permits curing in a solid, non-porous compound in open steam. One suitable mixture for a cure of fifty minutes at 287° F. is as follows:

| | |
|---|---|
| Olefin polysulfide reaction product___grams__ | 500 |
| Smoked sheets_____do____ | 75 |
| Zinc oxide_____do____ | 50 |
| Diphenylguanidine_____do____ | 4 |
| Orthotoluidine_____c. c.__ | 5 |
| Sulfur_____grams__ | 5 |
| Talc_____do____ | 140 |

This compound has excellent electrical properties and exhibits a high resistance to oils, acids, alkalis and organic solvents.

If the electrical properties are not of primary importance, as where the compound is to be used as a sheath enclosing an insulated conductor, a different mixture may be preferable. In such a compound it is desirable that the resistance to oils, acids, alkalis and organic solvents be increased. One suitable mixture for a cure of 50 minutes at 287° F. is as follows:

| | |
|---|---|
| Olefin polysulfide reaction product_____grams__ | 500 |
| Smoked sheets_____do____ | 50 |
| Diphenyl-guanidine_____do____ | 4.5 |
| Orthotoluidine_____c. c.__ | 5 |
| Zinc oxide_____grams__ | 50 |
| Talc_____do____ | 100 |
| Stearic acid_____do____ | 5 |
| Phenyl beta napthylamine_____do____ | 5 |
| Carbon black_____do____ | 50 |
| Sulfur_____do____ | 5 |

For somewhat softer cured compounds applicant has found that beta-napthylamine is suitable, while for still softer stock, beta-napthol may be used.

Olefine polysulfide reaction products cured in accordance with this invention have characteristics which make them highly desirable, among other things, as coverings for electrical conductors. The cured product is flexible and elastic, and resembles rubber in these respects. The cured product is firm and substantially non-porous. The product retains its high resistance to oil and chemicals, and also to the effect of corona discharge. The substance may be milled and handled in much the same manner as rubber, and the formation of the objectionable gas during such handling is largely avoided.

The foregoing description of certain specific embodiments of the invention is illustrative merely, and is not intended as defining the limits of the invention.

I claim:

1. The process of curing an olefin polysulfide reaction product which consists in heating the olefin polysulfide reaction product in the presence of orthotoluidine.

2. The process of curing an olefin polysulfide reaction product which consists in heating the olefin polysulfide reaction product in the presence of beta-napthylamine.

3. The process of curing an olefin polysulfide reaction product which consists in heating the olefin polysulfide reaction product in the presence of beta-napthol.

4. An uncured plastic substance containing an olefin polysulfide reaction product which yields a gaseous product upon heating, and also containing a small amount of an aromatic compound from the group consisting of orthotoluidine, beta-napthylamine and beta-napthol having the property of preventing or retarding the formation of gas in the mixture.

5. An uncured plastic substance containing an olefin polysulfide reaction product which yields a gaseous product upon heating, and also containing a small amount of orthotoluidine for preventing or retarding the formation of gas in the mixture.

6. An uncured plastic substance containing an olefin polysulfide reaction product which yields a gaseous product upon heating, and also containing a small amount of beta-napthylamine for preventing or retarding the formation of gas in the mixture.

7. An uncured plastic substance containing an olefin polysulfide reaction product which yields a gaseous product upon heating, and also containing a small amount of beta-napthol for preventing or retarding the formation of gas in the mixture.

8. A substantially non-porous plastic substance comprising an olefin polysulfide reaction product which has been heat treated in the presence of orthotoluidine.

9. A substantially non-porous plastic substance comprising an olefin polysulfide reaction product which has been heat treated in the presence of beta-napthylamine.

10. A substantially non-porous plastic substance comprising an olefin polysulfide reaction product which has been heat treated in the presence of beta-napthol.

11. A substantially non-porous plastic substance comprising an olefin polysulfide reaction product which has been heat treated in the presence of a reagent from the group consisting of orthotoluidine, beta-napthylamine and beta-napthol capable of combining with a gaseous product formed in the olefin polysulfide reaction product during heating to yield a condensation product.

12. An uncured plastic substance containing an olefin polysulfide reaction product which yields a gaseous product upon heating, and also containing a small amount of a mono amino derivative of an aromatic hydrocarbon of not more than two hexacarbocyclic rings and onto which is substituted an alkyl group in the ortho position when there is less than two hexacarbocyclic rings, for preventing or retarding the formation of gas in the mixture.

13. The process of curing plastic substances containing an olefin polysulfide reaction product which yield a gaseous product upon heating, which process consists in heating the plastic substance in the presence of a mono amino derivative of an aromatic hydrocarbon of not more than two hexacarbocyclic rings and onto which is substituted an alkyl group in the ortho position when there is less than two hexacarbocyclic rings, to cause the prevention of gas formation to take place under curing conditions.

14. A substantially non-porous plastic substance comprising an olefin polysulfide reaction product which yields a gaseous product upon heating and which has been heat treated in the presence of an aromatic compound from the group consisting of orthotoluidine, beta-napthylamine and beta-napthol preventing or retarding the formation of free gas in the olefin polysulfide reaction product.

15. A substantially non-porous plastic substance comprising an olefin polysulfide reaction product which yields a gaseous product upon heating, the said substance having been heat treated in the presence of a mono amino derivative of an aromatic hydrocarbon of not more than two hexacarbocyclic rings and onto which is substituted an alkyl group in the ortho position when there is less than two hexacarbocyclic rings, to cause the prevention of gas formation to take place under curing conditions.

GEORGE SPENCER LOBDELL.